United States Patent
Rado

(10) Patent No.: US 9,260,183 B2
(45) Date of Patent: *Feb. 16, 2016

(54) METHOD AND DEVICE FOR COMMUNICATING TRUE RUNWAY BRAKING PERFORMANCE USING DATA FROM THE FLIGHT DATA MANAGEMENT SYSTEMS OF LANDED AIRCRAFT

(71) Applicant: Aviation Safety Technologies, LLC, Chicago, IL (US)

(72) Inventor: Zoltan Ivan Rado, State College, PA (US)

(73) Assignee: AVIATION SAFETY TECHNOLOGIES, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/121,622

(22) Filed: Sep. 26, 2014

(65) Prior Publication Data

US 2015/0039200 A1 Feb. 5, 2015

Related U.S. Application Data

(63) Continuation of application No. 13/998,833, filed on Dec. 12, 2013, now Pat. No. 8,855,886, which is a continuation of application No. 13/694,746, filed on Dec. 28, 2012, now Pat. No. 8,630,782, which is a continuation of application No. 12/661,657, filed on Mar. 20, 2010, now Pat. No. 8,346,455, which is a continuation-in-part of application No. 11/352,984, filed on Feb. 13, 2006, now Pat. No. 7,797,095.

(60) Provisional application No. 60/654,914, filed on Feb. 23, 2005.

(51) Int. Cl.
| | | |
|---|---|---|
| B64C 25/42 | (2006.01) | |
| B60T 8/171 | (2006.01) | |
| B60T 8/17 | (2006.01) | |
| B64D 45/00 | (2006.01) | |

(52) U.S. Cl.
CPC ............... *B64C 25/42* (2013.01); *B60T 8/171* (2013.01); *B60T 8/1703* (2013.01); *B64C 25/426* (2013.01); *B64D 45/00* (2013.01)

(58) Field of Classification Search
USPC .............. 244/1 R, 100 R, 110 A, 110 R, 111; 303/126, 177, 150; 701/80, 70, 78, 83
See application file for complete search history.

(56) References Cited

U.S. PATENT DOCUMENTS

| | | |
|---|---|---|
| 2,930,026 A | 3/1960 | Steigervald |
| 4,122,522 A | 10/1978 | Smith |
| 4,404,633 A | 9/1983 | Goicoechea |
| 4,843,554 A | 6/1989 | Middleton et al. |

(Continued)

*Primary Examiner* — Benjamin P Lee
(74) *Attorney, Agent, or Firm* — William P. Oberhardt

(57) ABSTRACT

A computer network for calculating a value for the true braking coefficient of friction for an aircraft runway or taxiway using data from one or more aircraft's flight data recorders or flight data management systems, and reporting the calculated value information to individuals and agencies including air traffic control, airport operations and maintenance, and aircraft pilots and ground crews is described and claimed herein. The data may be obtained in real-time by either an onboard or an off-aircraft high-power computing system, calculating the aircraft's true braking coefficient of friction, and reporting the calculated information to the individuals and agencies.

20 Claims, 8 Drawing Sheets

(56) References Cited

U.S. PATENT DOCUMENTS

| | | |
|---|---|---|
| 5,047,942 A | 9/1991 | Middleton et al. |
| 5,918,951 A | 7/1999 | Rudd, III |
| 6,418,369 B2 | 7/2002 | Matsumoto et al. |
| 6,597,980 B2 | 7/2003 | Kogure |
| 6,628,995 B1 | 9/2003 | Korson et al. |
| 6,659,400 B2 | 12/2003 | Park |
| 6,752,353 B2 | 6/2004 | Park |
| 7,035,725 B1 | 4/2006 | Park et al. |
| 7,222,507 B2 | 5/2007 | Wetzel et al. |
| 7,286,909 B2 | 10/2007 | Darke |
| 7,586,422 B2 | 9/2009 | Goodman et al. |
| 7,626,513 B2 | 12/2009 | Goodman et al. |
| 2002/0072841 A1 | 6/2002 | Kogure |
| 2003/0025035 A1 | 2/2003 | Park |
| 2004/0069902 A1 | 4/2004 | Park |
| 2004/0177671 A1 | 9/2004 | Hurson |
| 2005/0107938 A1 | 5/2005 | Wetzel et al. |
| 2007/0132311 A1 | 6/2007 | Giazotto |
| 2007/0203633 A1 | 8/2007 | Johnsen |
| 2009/0187320 A1 | 7/2009 | Antanaitis et al. |

FLIGHT DATA RECORDER SCHEMATIC

EXAMPLE PRESSURE ALTITUDE(FT)VERSUS TIME(S)DATA FROM THE FLIGHT DATA RECORDER

EXAMPLE BRAKE PRESSURE(PSI) VERSUS TIME(S) DATA FROM THE FLIGHT DATA RECORDER DATA

EXAMPLE AUTOBRAKE SETTING VERSUS TIME(S) DATA FROM THE FLIGHT DATA RECORDER DATA

FIG. 5  A FRACTION OF EXAMPLE DATA FROM THE FLIGHT DATA RECORDER

| TITLE:JA8289 03/03/13F-O97 READOUT NO: | | | | | | | | | | | |
|---|---|---|---|---|---|---|---|---|---|---|---|
| B76F | RECORDER TYPE :DAR DATE MOUNTED: | | | | PRINT DATE:19MAR103 | | | | | | |
| A/C REG:JA8289 | REC/CASSETTE NO.:5480 DATE REMOVED: | | | | | | | | | | |
| ACMS VOL FILE :ANA\MAGIC\ROMDATA\0303199K.289 | | | | | | | | | | | |
| ACMS OPERATOR: | PROFILE USED: 30-SETUHYOU | | | | RATE:1SEC   FRAME:24934 | | | | | | |
| PARAMETER | 113 | 242 | 209 | 200 | 201 | 202 | 203 | 349 | 350 | 351 | 352 | 356 | 357 |
| PARAMETER | JST | PRESSURE | CAS | AILERON INBD LEFT | AILERON INBD RIGHT | AILERON OUTBD LEFT | AILERON OUTBD RIGHT | AIR/GRD SENSOR 1 | AIR/GRD SENSOR 2 | AIR/GRD SENSOR 3 | AIR/GRD SENSOR 4 | AUTOBRAK MODE 1 | AUTOBRAK MODE 2 |
| ELAPSED TIME (SEC) | HH:MM:SS | ALTITUDE | LEFT | | | | | | | | | | |
| 1 | | 717 | 132 | -6.9 | -3.7 | | 1.8 | AIR | AIR | AIR | AIR | NOT | NOT |
| 2 | 14:08:09 | 717 | 133.5 | -3.5 | -4.2 | 1.1 | | AIR | AIR | AIR | AIR | NOT | NOT |
| 3 | | 717 | 134 | -4.6 | -.6 | | 0.4 | AIR | AIR | AIR | AIR | NOT | NOT |
| 4 | | 717 | 135.5 | -3.3 | -3.9 | 0.7 | | AIR | AIR | AIR | AIR | NOT | NOT |
| 5 | | 712 | 138.3 | -.7 | -5.1 | | -0.4 | AIR | AIR | AIR | AIR | NOT | NOT |
| 6 | 14:08:13 | 705 | 141.3 | -1.9 | -3.2 | 0.7 | | AIR | AIR | AIR | AIR | NOT | NOT |
| 7 | | 693 | 142.5 | -3.7 | -3.7 | | 1.9 | AIR | AIR | AIR | AIR | NOT | NOT |
| 8 | | 678 | 143.8 | -3.7 | -4.4 | 1.1 | | AIR | AIR | AIR | AIR | NOT | NOT |
| 9 | | 667 | 141.5 | -5.8 | -1.4 | | 3.2 | AIR | AIR | AIR | AIR | NOT | NOT |
| 10 | 14:08:17 | 653 | 140.8 | -4.7 | -2.8 | 0.5 | | AIR | AIR | AIR | AIR | NOT | NOT |
| 11 | | 637 | 141.5 | -6.5 | -3.5 | | 1.8 | AIR | AIR | AIR | AIR | NOT | NOT |
| 12 | | 622 | 139.5 | -5.3 | -3.7 | 0.9 | | AIR | AIR | AIR | AIR | NOT | NOT |
| 13 | | 612 | 138.3 | -2.6 | -6.3 | | 0.4 | AIR | AIR | AIR | AIR | NOT | NOT |
| 14 | 14:08:21 | 603 | 140.8 | -1.6 | -7.6 | 3.3 | | AIR | AIR | AIR | AIR | NOT | NOT |
| 15 | | 589 | 138.8 | -1.1 | -7.2 | | -0.4 | AIR | AIR | AIR | AIR | NOT | NOT |
| 16 | | 575 | 137.8 | -3.7 | -4.2 | 1.2 | | AIR | AIR | AIR | AIR | NOT | NOT |
| 17 | | 562 | 137.8 | -3.5 | -6.2 | | 0.4 | AIR | AIR | AIR | AIR | NOT | NOT |
| 18 | 14:08:25 | 549 | 135.5 | -1.6 | -7.6 | 3.2 | | AIR | AIR | AIR | AIR | NOT | NOT |
| 19 | | 536 | 135.3 | -.4 | -4.2 | 3.7 | | AIR | AIR | AIR | AIR | NOT | NOT |
| 20 | | 525 | 133 | -3.3 | -7.7 | | 1.4 | AIR | AIR | AIR | AIR | NOT | NOT |
| 21 | | 512 | 132.8 | 0.7 | -8.6 | 2.5 | | AIR | AIR | AIR | AIR | NOT | NOT |
| 22 | 14:08:29 | 505 | 133 | -2.1 | -6.5 | | -1.1 | AIR | AIR | AIR | AIR | NOT | NOT |
| 23 | | 496 | 132 | -3.2 | -6.3 | 1.4 | | AIR | AIR | AIR | AIR | NOT | NOT |
| 24 | | 489 | 134.3 | -1.9 | -5.1 | | 0.4 | AIR | AIR | AIR | AIR | NOT | NOT |
| 25 | | 479 | 133.8 | -.6 | -2.1 | 0.9 | | AIR | AIR | AIR | AIR | NOT | NOT |
| 26 | 14:08:33 | 470 | 133.3 | -6.5 | -3.5 | | 2.6 | AIR | AIR | AIR | AIR | NOT | NOT |
| 27 | | 461 | 133.5 | -1.9 | -6.7 | 2.6 | | AIR | AIR | AIR | AIR | NOT | NOT |
| 28 | | 455 | 132.3 | -.3 | -6.5 | | 0.4 | AIR | AIR | AIR | AIR | NOT | NOT |

THE METHOD OF THE CALCULATION

POST PROCESSING AND DISTRIBUTION

REAL-TIME PROCESSING AND DISTRIBUTION

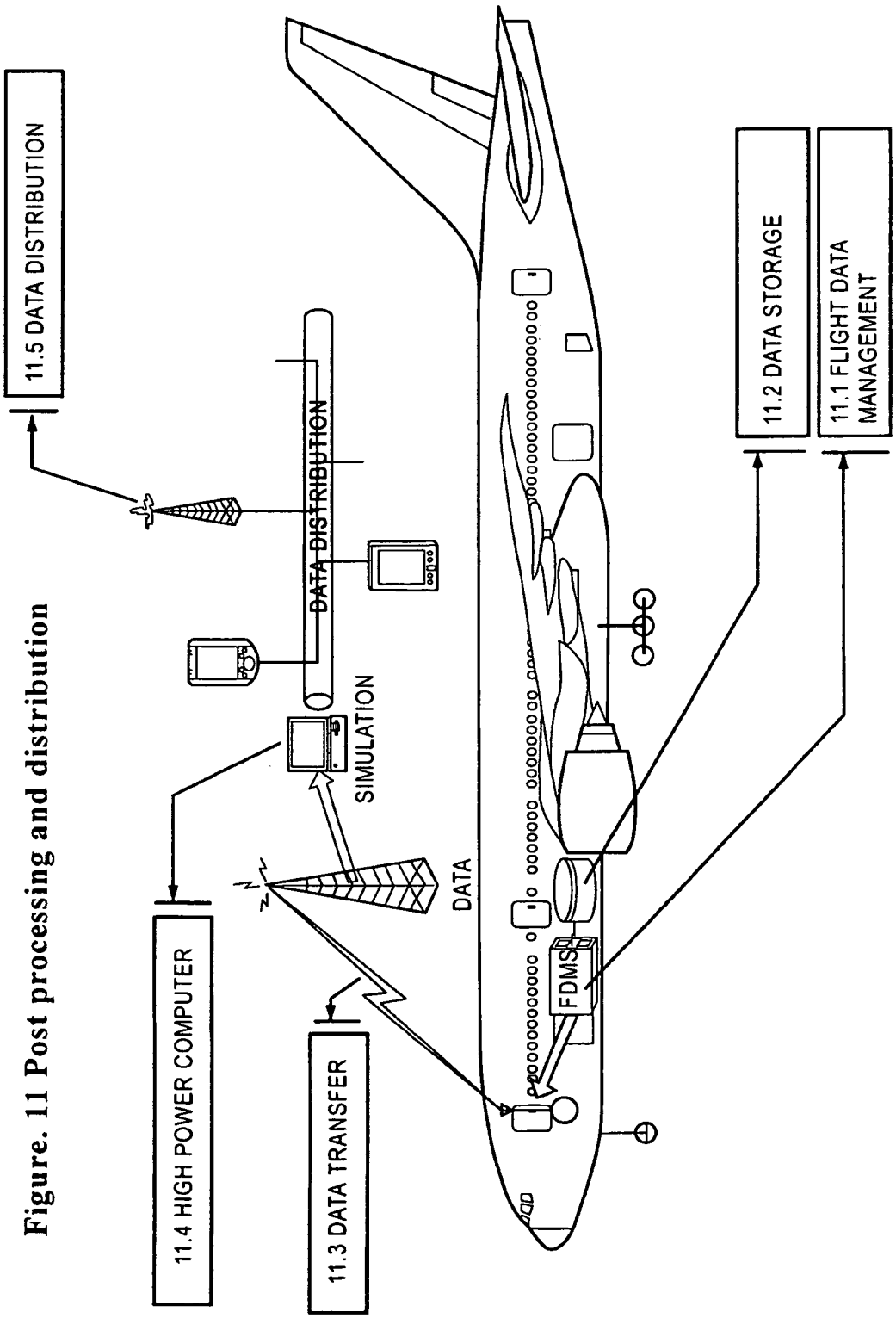
Figure. 11 Post processing and distribution

METHOD AND DEVICE FOR COMMUNICATING TRUE RUNWAY BRAKING PERFORMANCE USING DATA FROM THE FLIGHT DATA MANAGEMENT SYSTEMS OF LANDED AIRCRAFT

This application is a continuation of U.S. application Ser. No. 13/998,833, filed Dec. 12, 2013, now U.S. Pat. No. 8,855, 886, issued Oct. 7, 2014, which, in turn, is a continuation of U.S. application Ser. No. 13/694,746, filed Dec. 28, 2012, now U.S. Pat. No. 8,630,782, issued Jan. 14, 2014, which, in turn, is a continuation of U.S. application Ser. No. 12/661, 657, filed Mar. 20, 2010, now U.S. Pat. No. 8,346,455, issued Jan. 1, 2013, which, in turn, is a continuation-in-part of U.S. application Ser. No. 11/352,984, filed Feb. 13, 2006, now U.S. Pat. No. 7,797,095, issued Sep. 14, 2010, which, in turn, claims the benefit of and priority from U.S. provisional application No. 60/654,914, filed Feb. 23, 2005, all of the disclosures of which are incorporated herein by reference.

BACKGROUND OF THE INVENTION

1. Field of Invention

This invention relates to the method and the device of calculating aircraft braking friction and other aircraft performance and pavement surface characteristics parameters related to aircraft landing and takeoff including but not limited to aircraft braking action, aircraft takeoff distance, aircraft landing distance, runway surface conditions and runway surface friction—from now on referred as true aircraft landing performance parameters—based on the data collected or otherwise available on board of an aircraft in electronic or other format from the aircraft Flight Data Recorder (FDR) or any other flight data providing or management system for example the Quick Access Recorder (QAR). In greater particularity, this invention relates to a method and apparatus for the determination of a standardized or normalized coefficient of braking friction using data from the flight data management systems (FDMS) and flight data recorders (FDRs) of individual arriving aircraft on a particular airport runway, thereby creating a data set which is both redundant and continuously updated, and reporting this information in real-time to individuals and agencies including air traffic control, airport operations and maintenance, and aircraft pilots and ground crews.

2. Background

Under severe winter conditions airlines, airports, civil aviation organizations and countries rigorously impose limits on aircraft takeoff, landing and other surface movement operations as well as enforce weight penalties for aircraft takeoffs and landings. These limits depend on the weather, runway and taxiway surface conditions and aircraft braking and takeoff performance. At the present these limits are calculated from the assumed aircraft braking performance based on runway conditions. These conditions are established by visual inspections, weather reports and the measurements of runway friction coefficient using ground friction measurement equipment.

At the present time, there are several practices to calculate the assumed aircraft braking performance:

1. The Canadian CRFI Method:

The CRFI method comprises of a runway surface friction measurement performed by braking a passenger vehicle traveling on the runway at a certain speed and measuring the maximum deceleration of it at several locations along the length of the runway. The measured deceleration data is taken then and a braking index chart is used to calculate the assumed aircraft braking performance. The obtained aircraft landing performance data and calculated assumed braking friction is provided to airline operators, pilots and airport personnel for decision making.

2. The Reported Runway Friction Coefficient by a Runway Friction Measurement Equipment:

There are a great many number of runway friction measurement devices manufactured by different companies, in different countries and working based on different principles. Some of the most common devices are: (a) continuous friction measurement equipment (CFME); (b) decelerometers; and (c) side force friction coefficient measurement equipment. This equipment is operated by airport operation personnel according to the manufacturer's instructions on the runways, aprons, and taxiways and the measured friction coefficient is recorded. The recorded friction coefficient is then distributed to airline operation personnel, pilots, and airport personnel. The measured coefficient of friction is dependent of the measurement device, under the same conditions and on the same runway different runway friction measurement devices based on different principles will record different runway friction coefficients. These runway friction coefficients are assumed to relate to actual aircraft landing and takeoff performance.

3. The New Proposed IRFI Method:

The International Runway Friction Index (IRFI) is a computational method to harmonize the reported runway friction numbers reported by the many different runway surface friction measurement equipments. The method was developed through an international effort with 14 participating countries. The method is a mathematical procedure based on simple linear correlations. The IRFI procedure is using a mathematical transformation to take the reported measurement of a runway friction measurement device and compute using simple mathematical methods an index called the IRFI. The mathematical procedures are the same for all the different runway friction measurement device using a different set of constant parameters that was determined for each individual device. It is assumed that using this procedure the different runway friction measurement devices reporting different friction coefficients can be harmonized. The calculated IRFI is assumed to correlate to aircraft landing and takeoff performance.

4. Pre-Determined Friction Levels Based on Observed Runway Conditions, Current and Forecasted Weather Conditions:

This method is available for airport operators according to new regulations. The method is based on airport personnel driving through the runway and personally observing the runway surface conditions. The ice, snow, water and other possible surface contaminants are visually observed and their depth measured or estimated by visual observation. The estimated runway conditions with weather information are then used to lookup runway friction coefficient in a table.

All these above mentioned practices are based on the measurement of the runway friction coefficient using ground friction measuring equipment, visual observation, weather information or combinations of these. However, according to present practices, there are several problems with the measurement of the runway friction coefficient using these methods.

1. Need of a special device/car: there is a special car needed to be able to measure the runway friction coefficient. There are special devices to measure the runway friction coefficient that are commercially available; however, most of these devices are very expensive. Therefore, not every airport can afford to have one.

2. Close of runway: for the duration of the measurement the runway has to be closed for takeoffs and landings as well as any aircraft movement. The measurement of the runway surface friction takes a relatively large amount of time since a measuring device has to travel the whole length of the runway at a minimum one time but during severe weather conditions it is possible that more than one measurement run is needed to determine runway surface friction. The closing of an active runway causes the suspension of takeoff and landing aircraft operations for a lengthened period of time and therefore is very costly for both the airlines and the airport. The using of ground vehicles to measure runway friction poses safety hazard especially under severe weather conditions.

3. Inaccurate result due to lack of maintenance and inaccurate calibration level: the result of the measurements are very dependent of the maintenance and the calibration level of measurement devices, therefore the result can vary much, and could lose reliability.

4. Confusing results due to the differences between ground friction devices: It has been established that the frictional values reported by different types of ground friction measurement equipment are substantially different. In fact, the same type and manufacture, and even the same model of equipment frequently report highly scattered frictional data. Calibration and measurement procedures are different for different types of devices. The repeatability and reproducibility scatter, or in other word uncertainty, of measurements for each type of ground friction measurement device is therefore amplified and the spread of friction measurement values among different equipment types is significant.

5. Inaccurate result due to rapid weather change: Airport operation personnel, in taking on the responsibility of conducting friction measurements during winter storms, find it difficult to keep up with the rapid changes in the weather. During winter storms runway surface conditions can change very quickly and therefore friction measurement results can become obsolete in a short amount of time, thus misrepresenting landing and takeoff conditions.

6. Inaccurate result due to the difference between aircraft and the ground equipment: It is proven that the aircraft braking friction coefficients of contaminated runways are different for aircrafts compared to those reported by the ground friction measurement equipment.

7. Inaccurate result due to the lack of uniform runway reporting practices: For many years the international aviation community has had no uniform runway friction reporting practices. The equipment used and procedures followed in taking friction measurements varies from country to country. Therefore, friction readings at various airports because of differences in reporting practices may not be reliable enough to calculate aircraft braking performance.

Therefore this invention recognizes the need for a system directly capable of determining the true aircraft landing performance parameters based on the data collected by and available in the aircraft Flight Data Recorder (FDR) or other flight data management systems. By utilizing the novel method in this invention for the first time every involved personnel in the ground operations of an airport and airline operations including but not limited to aircraft pilots, airline operation officers and airline managers as well as airport operators, managers and maintenance crews, will have the most accurate and most recent information on runway surface friction and aircraft braking action, especially on winter contaminated and slippery runways.

Utilizing this method the aviation industry no longer has to rely on different friction reading from different instrumentations and from different procedures.

Therefore, this method will represent a direct and substantial benefit for the aviation industry.

BRIEF SUMMARY OF THE INVENTION

Objective of the Invention

The objective of this invention is to provide every personnel involved in the ground operations of an airport and involved in airline operations including but not limited to aircraft pilots, airline operation officers, and airline managers, as well as airport operators, managers and maintenance crews, the most accurate and most recent information on the true aircraft landing and takeoff performance parameters to help in a better and more accurate safety and economical decision making, and to prevent any accident, therefore save lives.

BRIEF SUMMARY OF THE INVENTION

This unique and novel invention is based on the fact that most modern airplanes throughout the entire flight including the takeoff and landing measures, collect and store data on all substantial aircraft systems including the braking hydraulics, speeds and hundreds of other performance parameters. During the landing maneuver real time, or after the aircraft is parked at the gate, this data can be retrieved, processed and the true aircraft landing performance parameters can be calculated.

During a landing usually an aircraft uses its speed brakes, spoilers, flaps and hydraulic and mechanic braking system and other means to decelerate the aircraft to acceptable ground taxi speed. The performance of these systems together with many physical parameters including but not limited to various speeds, deceleration, temperatures, pressures, winds and other physical parameters are monitored, measured, collected and stored in a data management system on board of the aircraft (FIG. 1).

All monitored parameters can be fed real time into a high powered computer system, either on-board the aircraft or in a fixed remote location, that is capable of processing the data and calculating all relevant physical processes involved in the aircraft landing maneuver. Based upon the calculated physical processes the actual effective braking friction coefficient of the landing aircraft can be calculated. This, together with other parameters and weather data, can be used to calculate the true aircraft landing performance parameters (FIG. 6).

If real time data processing is not chosen, then the collected data from the aircraft can be transported by wired, wireless or any other means into a central processing unit where the same calculation can be performed (FIG. 8).

The obtained true aircraft landing performance parameters data then can be distributed to every involved personnel in the ground operations of an airport and airline operations including but not limited to aircraft pilots, airline operation officers, and airline managers, as well as airport operators, managers and maintenance crews.

Utilizing the novel method in this invention for the first time every personnel involved in the ground operations of an airport and airline operations including but not limited to aircraft pilots, airline operation officers, and airline managers, as well as airport operators, managers and maintenance crews, will have the most accurate and most recent information on runway surface friction and aircraft braking action.

Utilizing this method, all the above mentioned (see BACKGROUND OF THE INVENTION) problems can be solved:

1. No need of a special device/car: this method uses the airplane itself as measuring equipment, therefore no additional equipment needed. Moreover, no additional sensor is needed. This method uses the readings of present sensors and other readily available data of an aircraft.

2. No need for closing of runway: the duration of the measurement is the landing of the aircraft itself. Therefore the runway does not have to be closed.

3. No inaccurate result due to maintenance and the calibration level: because this method uses the aircraft itself as the measuring device, there is no variation due to the maintenance and the calibration level of these ground friction measuring devices. The result of the calculation will give back the exact aircraft braking friction the aircraft actually develops and encounters.

4. No inaccurate result due to the different between ground friction devices: because this method uses the aircraft itself as the measuring device, there is no variation due to the different ground friction measuring devices.

5. Accurate result even in rapid weather change: As long as aircraft are landing on the runway, the most accurate and most recent information on the true aircraft landing performance parameters will be provided by each landing.

6. No inaccurate result due to the difference between aircraft and the ground equipment: because this method uses the aircraft itself as the measuring device, there is no discrepancy in the measured and real friction due to the difference between aircraft and the ground equipment.

7. No inaccurate result due to the lack of uniform runway reporting practices: because this method uses the aircraft itself as the measuring device, there is no variation due to the difference in reporting practices.

Utilizing this method the aviation industry no longer has to rely on different friction readings from different instrumentations and from different procedures.

Therefore, this method represents a direct and substantial safety and economic benefits for the aviation industry.

The significance of this invention involves saving substantial amounts of money for the airline industry by preventing over usage of critical parts, components of the aircraft including but not limited to brakes, hydraulics, and engines.

While increasing the safety level of the takeoffs, it could generate substantial revenue for airlines by calculating the allowable take off weight, thus permissible cargo much more precisely.

BRIEF DESCRIPTION OF THE SEVERAL VIEWS OF THE DRAWING

FIG. 5 A fraction of example data from the Flight Data Recorder: It is an illustration of the data from the FDR.

FIG. 11 A schematic flow chart illustrating a further embodiment of the invention incorporating real-time off-aircraft processing and distribution.

DETAILED DESCRIPTION OF THE INVENTION

Figure 1:
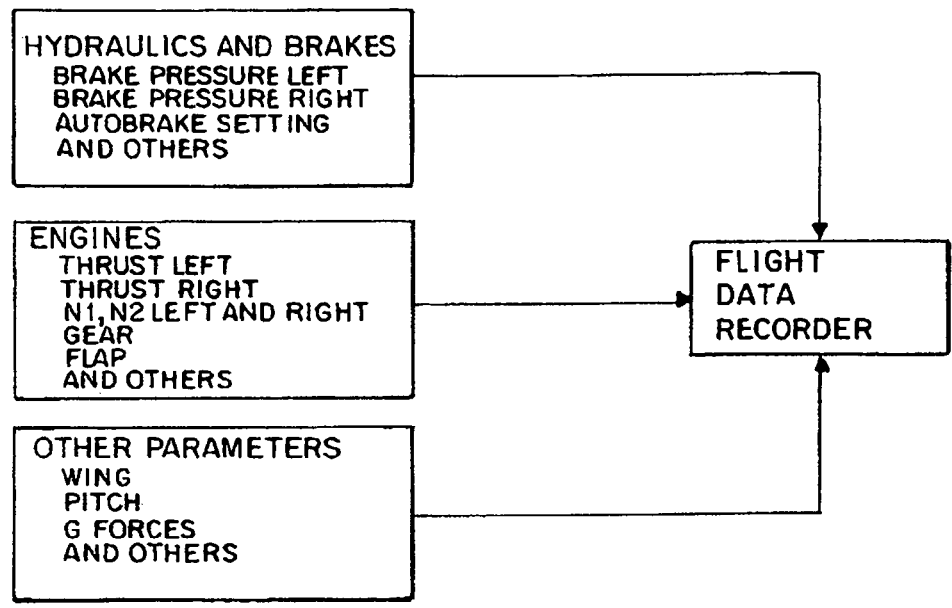
FIG. 1 Flight Data Recorder schematic: It is an illustration for the data collection structure of the Flight Data Recorder (FDR).

FIG. 1—This unique and novel invention is based on the fact that every airplane during landing uses the hydraulics and braking system. During a landing usually an aircraft uses its speed brakes, spoilers, flaps and hydraulic and mechanical braking system and other means to decelerate the aircraft to acceptable ground taxi speed. The relationship of these systems to the deceleration of an aircraft in optimal conditions is a known quantity. Therefore any deviation from optimal deceleration is necessarily due to non-optimal weather and runway surface conditions. The performance of these systems together with many physical parameters including but not limited to various speeds, deceleration, temperatures, pressures, winds and other physical parameters are monitored, measured, collected and stored in a data management system on board of the aircraft. This figure presents the schematics of the three major components of data sources onboard of an aircraft relevant to this invention, the measured and recorded parameters related to the braking system, the measured and recorded parameters relating to the engines, flight and other control systems of the aircraft, and the dynamic, external and environmental parameters measured and recorded.

Figure 2:
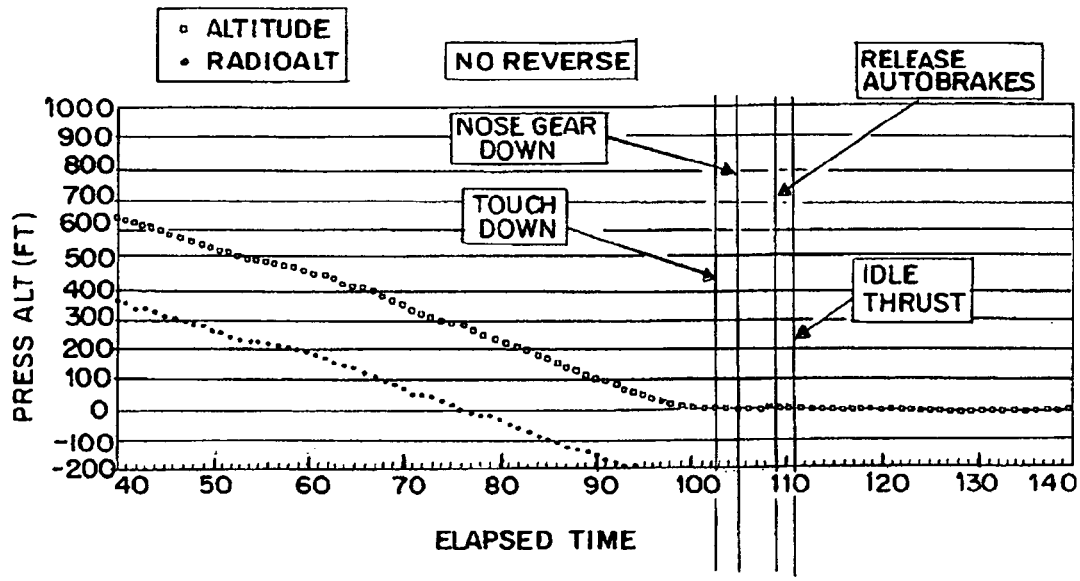
FIG. 2 Example Pressure Altitude (ft) versus Time(s) data from the Flight Data Recorder Data: It is a graphical illustration of the data from the FDR, which shows an example for the Pressure Altitude (ft) versus Time(s) during a landing.
Figure 3:
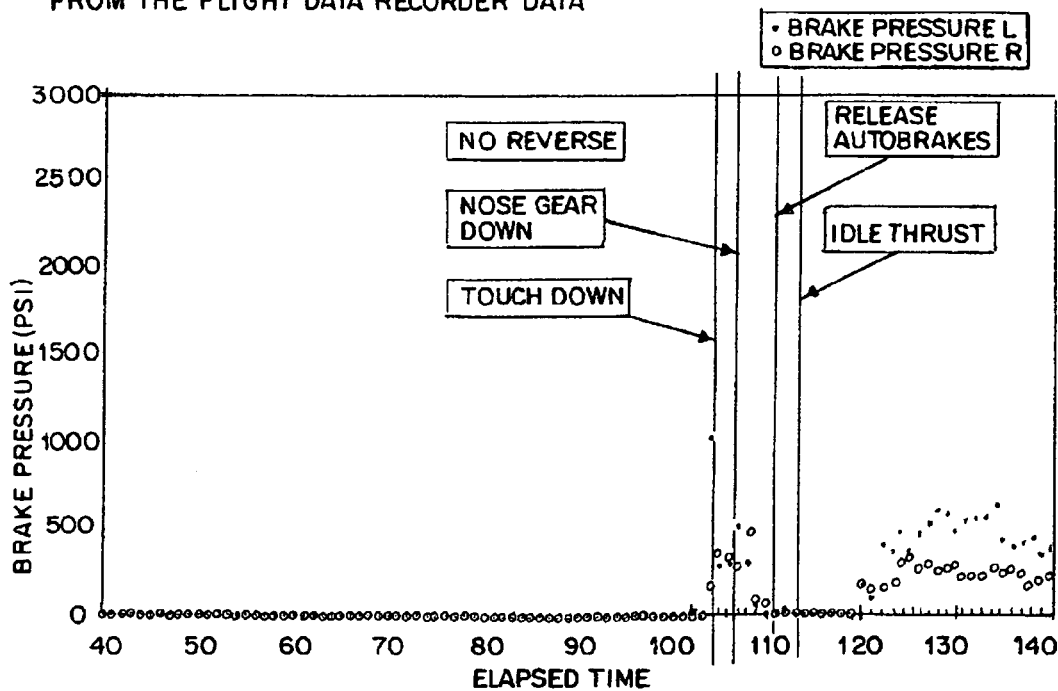
FIG. 3 Example Brake Pressure (psi) versus Time(s) data from the Flight Data Recorder Data: It is a graphical illustration of the data from the FDR, which shows an example the Brake Pressure versus Time(s) during a landing.
Figure 4:
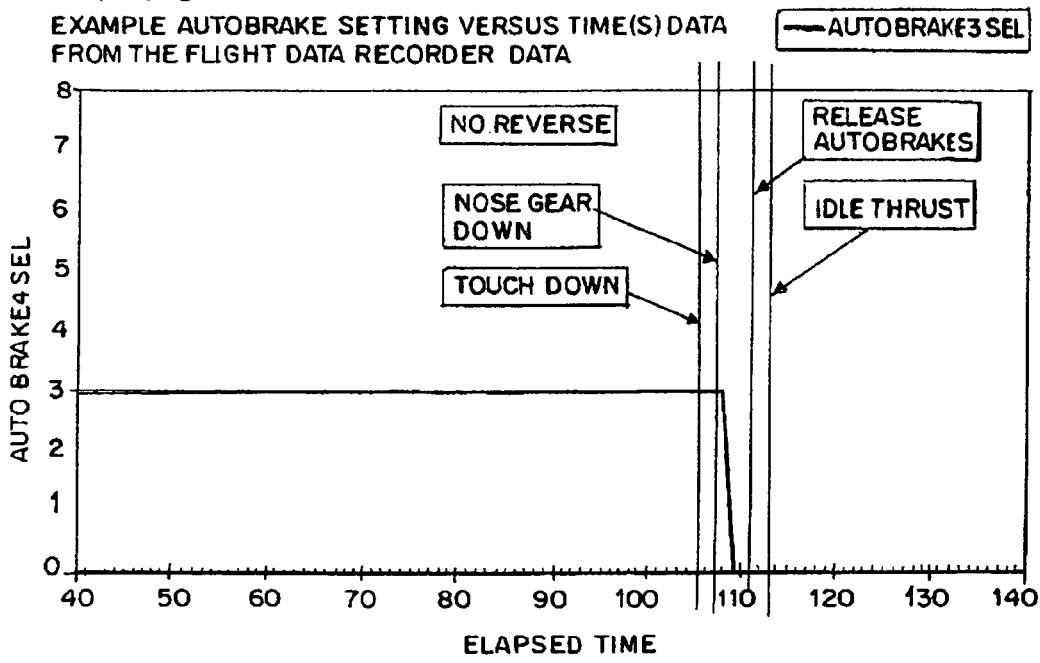
FIG. 4 Example AutoBrake setting versus Time(s) data from the Flight Data Recorder Data: It is a graphical illustration of the data from the FDR, which shows an example the AutoBrake settings versus Time(s) during a landing.

FIG. 2-FIG. 5. This invention uses the sequence of data points recorded from the touch down of the aircraft until it reaches the normal taxiing speed or comes to a stop. In the continuous data stream of the flight data management system the touch down is marked by several events making it possible to detect the beginning data point of the calculation process. From that point until the aircraft comes to complete stop at the gate every necessary data point can be identified within the recorded data, with a preferred sampling frequency of at least one data sample per second. FIG. 2 shows the recorded altitude measurements for an actual landing FIG. 3 depicts the measured the recorded hydraulic braking pressures, FIG. 4 presents the recorded data for the auto-brake selection and FIG. 5 illustrate the format of the recorded data that can be obtained form a digital flight data management system.

Figure 6:
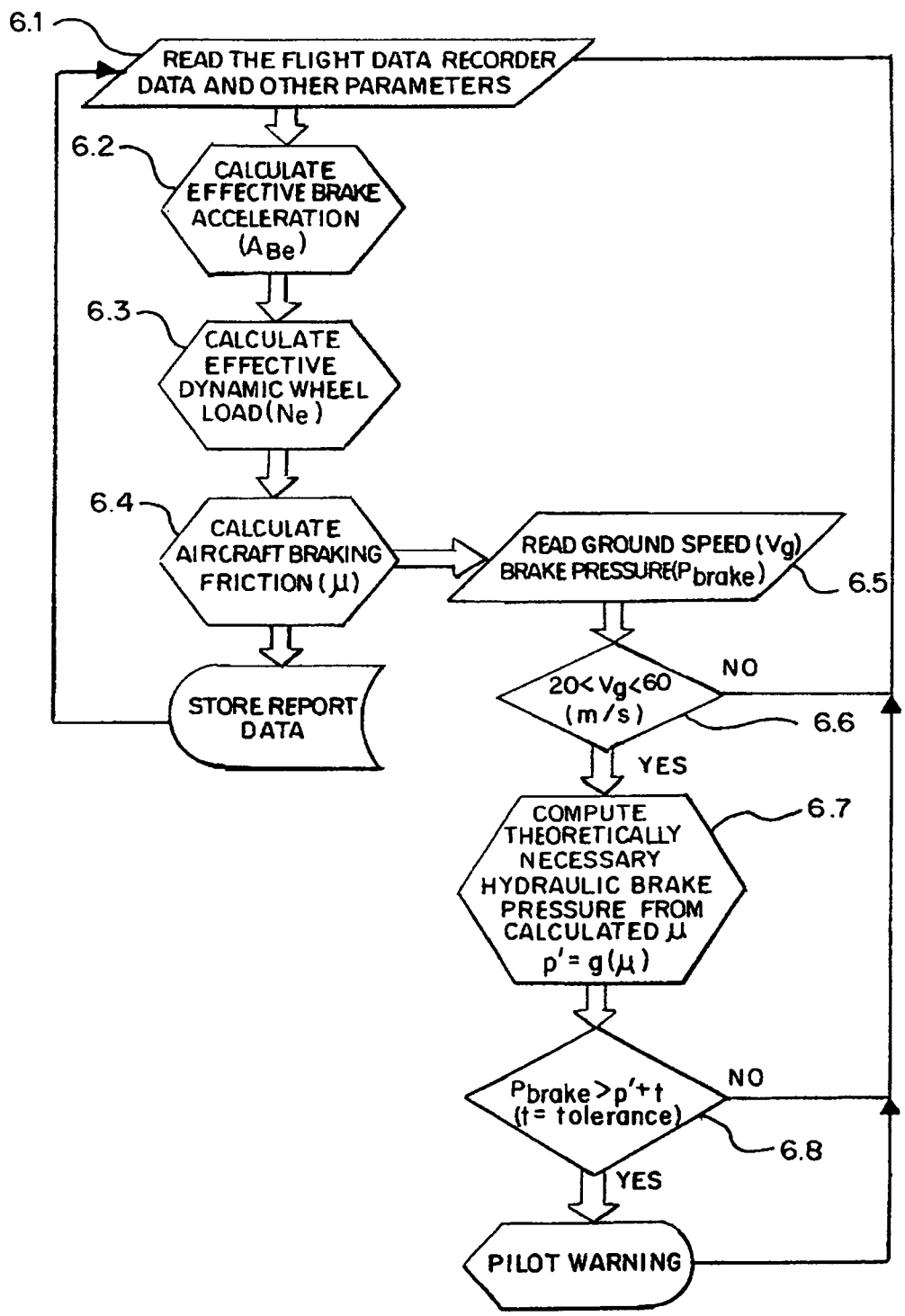
FIG. 6 The method of the calculation: The flow chart of the calculations and computations of the method.

FIG. 6—To arrive to the end result a number of different mathematical and physical modeling approaches are possible through different sets of dynamic equations and/or various methods of simulations based upon the availability of different sets of data from the flight data management system.

The following equations only represent an example of the possible approaches, and therefore the invention and the presented method is not limited to these equations.

6.1—The following data is used as one of the possible minimum data sets for the calculation, although more and/or different data can be utilized to calculate the same parameters and/or improve the precision of the calculation.

Data from the Flight Data Recorder: $V_{air}$—Air Speed, $P_{LB}$, $P_{RB}$—Left and Right Brake Pressure, $V_{ground}$—Ground Speed, $A_x$—Longitudinal Acceleration, $A_c$—Vertical Acceleration, $E_{RPM}$—Engine RPM, $S_{spoiler}$—Spoiler setting, $S_{airbrake}$ Airbrake setting, $S_{aileron}$—Aileron setting, $C_{flap}$—Flap configuration, $C_{\theta pitch}$—Pitch, $S_{RT}$—Reverse thrust setting, $S_T$—Engine thrust setting.

The following environmental data are used in the calculation. $T_{air}$—Air Temp, $P_{alt}$—Pressure Altitude, $P_{air}$—Air Pressure, $H_{\%}$—Relative humidity, $\Delta_{Runway}$—Runway elevation.

The following aircraft parameters are used in the calculation. $M_{landing}$—Landing Mass, $E_{type}$—Engine type, $N_{engine}$—Number of engines, $TY_{tire}$—Tire type, $TY_{aircraft}$—Aircraft type.

6.2—The method calculates, through a three-dimensional dynamic model, all relevant physical processes involved in the aircraft landing maneuver and separates them so they are individually available for use. The first intermediate result of the method is the time or distance history of all relevant, separated, interdependent decelerations generated by the different systems in an aircraft. These decelerations are cumulatively measured by the onboard measurement system and reported in the flight data stream. The separated decelerations calculated from the different physical processes make it possible to calculate the true deceleration developed only by the actual effective braking friction coefficient of the landing aircraft.

Based on the above, the software calculates the brake effective acceleration vs. time based on Equation (1).

$$A_{Be} = A_x - A_{Drag} - A_{ReverseThrust} - A_{Rolling\,Resistance} - A_{Pitch} \quad (1)$$

where $A_{Be}$ is the brake effective acceleration;
$A_x$ is the measured cumulative longitudinal acceleration (6.1);
$A_{Drag}$ is the deceleration due to the aerodynamic drag, $$A_{Drag} = f(V_{air}, S_{spoiler}, S_{airbrake}, S_{aileron}, C_{flap}, T_{air}, P_{air}, H_{\%}, M_{landing}, TY_{aircraft}) \quad (2)$$

where $V_{air}$, $S_{spoiler}$, $S_{airbrake}$, $S_{aileron}$, $C_{flap}$, $T_{air}$, $P_{air}$, $M_{landing}$, $TY_{aircraft}$, are parameters from 6.1;
$A_{ReverseThrust}$ is the acceleration caused by thrust/reverse-thrust, $$A_{ReverseThrust} = f(E_{type}, N_{engine}, T_{air}, P_{air}, H_{\%}, E_{RPM}, S_{RT}, M_{landing}, TY_{aircraft}) \quad (3)$$

where $E_{type}$, $N_{engine}$, $T_{air}$, $P_{air}$, $H_{\%}$, $E_{RPM}$, $S_{RT}$, $M_{landing}$; $TY_{aircraft}$, are parameters from 6.1;
$A_{RollingResistance}$ is the cumulative deceleration due to other effects such us tire rolling resistance, runway longitudinal elevation, $$A_{Rolling\,Resistance} = f(tire, V_g, M_{landing}) \quad (4)$$

where tire, $V_g$, $M_{landing}$ are parameters from 6.1;
$A_{pitch}$ is due to the runway elevation $$A_{pitch} = f(\Delta_{Runway}) \quad (5)$$

where $\Delta_{Runway}$ is the runway elevation from 6.1.

This true deceleration ($A_{Be}$) developed only by the actual effective braking friction coefficient of the landing aircraft, then can be used in further calculations to determine the true aircraft braking coefficient of friction.

In practicing the invention, a suitable way of calculating $A_{Drag}$ is:

$$A_{Drag} = \tfrac{1}{2} \cdot ((C_D \cdot \rho)/M_{landing}) \cdot V_{TAir}^2 \cdot S(S_{spoiler}, S_{airbrake}, S_{aileron}, C_{flap}, TY_{aircraft})$$

where:

$C_D$ is coefficient of aerodynamic drag, constant parameter
$\rho$ is the air density;
$V_{TAir}$ is the True Airspeed of the aircraft;
$S_{Spoiler}$ is active surface area of spoilers;
$S_{AirBrakes}$ is active surface area of air brakes;
$S_{aileron}$ is active surface area of ailerons; and
$S_{flap}$ is active surface area of flaps.

A suitable way of calculating $A_{Reverse}$ is:

$$A_{Reverse} = (\text{MaxEngineThrust}/M_{landing}) \cdot \eta_{reverser} \cdot N_{engine} \cdot C_{EngineType}(1 + E^{(k/Nengine) \cdot (VTAir + b)})$$

where:

MaxEngineThrust is the maximum available thrust of a the engines;
$M_{landing}$ is the aircraft mass during landing;
$\eta_{reverser}$ is the efficiency of the thrust reverser;
$N_{engine}$ is the rotational speed of the low pressure rotor of the engine;
$C_{EngineType}$ 1 is a constant depending on jet engine type;
k is a constant turbofan engine speed parameter depending on jet engine type;
$V_{TAir}$ is the True Airspeed of the aircraft; and
b is a constant engine speed parameter depending on engine type.

A suitable way of calculating $A_{RollingResistance}$ is:

$$A_{RollingResistance} = \text{Const}_{1,TireType} \cdot V^{2.5}_{Ground} + \text{Const}_{2,TireType}$$

where:

$\text{Const}_{1,TireType}$ is a constant value dependent on tire type, construction and material;
$V_{Ground}$ is the aircraft ground speed; and
$\text{Const}_{2,TireType}$ is a constant value dependent on tire type, construction and material.

A suitable way of calculating Lift is:

$$\text{Lift} = ((\rho/2) \cdot C_L' \cdot \text{square root}(C_D \cdot C_{1,TYAircraft})/C_{2,TYAircraft}) \cdot V_{TAir} \cdot S(S_{spoiler}, S_{airbrake}, S_{aileron}, C_{flap}, TY_{aircraft})$$

where:

$C_L'$ is the aerodynamic list coefficient of the aircraft active surface;
$C_D$ is the coefficient of aerodynamic drag, constant parameter;
$C_{1,TYAircraft}$ is a constant aerodynamic parameter dependent on aircraft type and landing configuration;
$C_{2,TYAircraft}$ is a constant aerodynamic parameter dependent on aircraft type and landing configuration;
$V_{TAir}$ is the True Airspeed of the aircraft;
$C_{flap}$ is a constant added active surface area parameter; and
$TY_{Aircraft}$ type of aircraft.

A suitable way of calculating LoadTransfer is:

$$\text{LoadTransfer} = ((CG_{height} \cdot A_{Be} + g \cdot CG_{DistanceFromNoseGear})/\text{WheelBase}) \cdot M_{landing}$$

where:

$CG_{height}$ is the height of the aircraft center of gravity above the ground;
g is the natural acceleration of gravity;
$CG_{DistanceFromNoseGear}$ is the distance of the aircraft center of gravity from the nose gear;

WheelBase is the distance between the nose and landing gears; and $M_{landing}$ is the aircraft mass during the landing.

6.3—Using the recorded data stream of the aircraft with the parameters indicated in point 6.1, plus weather and environmental factors reported by the airport or measured onboard of the aircraft and therefore available in the recorded data, together with known performance and design parameters of the aircraft available from design documentation and in the literature, the dynamic model calculates all relevant actual forces acting on the aircraft as a function of the true ground and air speeds, travel distance and time. Using the results, the dynamic wheel loads of all main gears and the nose gear can be calculated.

Since the dynamic vertical acceleration of the aircraft is measured by the onboard inertial instrumentation, the effective dynamic wheel load (N) can be calculated by the deduction of the calculated retarding forces by means of known aircraft mass; together with the determined gravitational measurement biases introduced by runway geometry and aircraft physics using Equation 6 through 9.

$$N = M_{landing} \cdot \cos(\theta_{pitch}) \cdot g - \text{Lift} - \text{Load Transfer} - \text{MomentumLift} + g(A_c, M_{landing}) \quad (6)$$

where

Lift is the computed force of the sum of all lifting forces acting on the aircraft through aerodynamics:

$$\text{Lift} = f(V_{air}, S_{spoiler}, S_{airbrake}, S_{aileron}, C_{flap}, T_{air}, P_{air}, H_{\%}, M_{landing}, TY_{aircraft}) \quad (7)$$

where $V_{air}$, $S_{spoiler}$, $S_{airbrake}$, $S_{aileron}$, $C_{flap}$, $T_{air}$, $P_{air}$, $H_{\%}$, $M_{landing}$, $TY_{aircraft}$ are parameters from point 6.1.

LoadTransfer is the load transfer from the main landing gear to the nose gear due to the deceleration of the aircraft:

$$\text{LoadTransfer} = f(A_{Be}, M_{landing}, TY_{aircraft}) \quad (8)$$

where $A_{Be}$, $M_{landing}$, $TY_{aircraft}$ are parameters from 6.1.

MomentumLift is the generated loading or lifting forces produced by moments acting on the aircraft body due to the acting points of lift, thrust and reverse-thrust forces on the aircraft geometry:

$$\text{MomentumLift} = f(S_{Thrust}, S_{RT}, C_{flap}, TY_{aircraft}) \quad (9)$$

where $S_{Thrust}$, $S_{RT}$, $C_{flap}$, $TY_{aircraft}$ are parameters from point 6.1.

$g(A_c, M_{landing})$ is the dynamic force acting on the landing gear due to the dynamic vertical movement of the aircraft, and thus the varying load on the main gear due to the runway roughness, where $A_c$, $M_{landing}$ are parameters from point 6.1.

6.4—The deceleration caused by the wheel braking system of the aircraft calculated in point 6.2 ($A_{Be}$ is the true brake effective deceleration), together with the computed actual wheel load forces acting on the main gears of the aircraft can be used to calculate the true braking coefficient of friction. First the actual true deceleration force or friction force ($F_{Fr}$) caused by the effective braking of the aircraft have to be computed. From the brake effective deceleration ($A_{Be}$) obtained in 6.2 and the available aircraft mass, the method calculates the true effective friction force based on the formula:

$$F_{Fr} = M_{landing} \cdot A_{Be} \quad (10)$$

where $M_{landing}$ is the landing mass of the aircraft from point 6.1 and $A_{Be}$ is the calculated brake effective deceleration from Equation (1).

The determined true deceleration force ($F_{Fr}$) in equation 10 together with the Actual effective dynamic wheel load (N) obtained in 6.3 can be utilized to calculate the true effective braking coefficient of friction .mu. using equation 11:

$$\mu = F_{Fr}/N \quad (11)$$

where

N is the calculated effective dynamic wheel force acting on the tire (6.3);

and $F_{Fr}$ is the friction force from Equation (10).

6.5—Using the calculated effective true frictional forces, together with parameters measured by the aircraft data management system (such as downstream hydraulic braking pressure), a logical algorithm based on the physics of the braking of pneumatic tires with antiskid braking systems was designed to determine whether the maximum available runway friction was reached within the relevant speed ranges of the landing maneuver.

Together with the actual friction force the following logic is used by this invention to determine:

(A) If friction limited braking is encountered.

If the actual available maximum braking friction available for the aircraft was reached by the braking system and even though more retardation was needed the braking system could not generate because of the insufficient amount of runway surface friction a friction limited braking was encountered.

(B) If adequate friction for the braking maneuver was available.

If friction limited braking was not encountered and the braking was limited by manual braking or the preset level of the auto-brake system, the adequate surface friction and actual friction coefficient can be calculated and verified.

6.6—In order to make sure that the auto-brake and antiskid systems of the aircraft were working in their operational range, the algorithm is analyzing the data to look for the friction limited sections only in an operational window where the landing speed is between 20 m/s and 60 m/s.

6.7—From the computed true effective braking coefficient of friction $\mu$ calculated in 6.4 the method computes the theoretically necessary hydraulic brake pressure $P_{brake}$ and from the dynamics of the landing parameters an applicable tolerance is calculated t.

6.8—The data is analyzed for the deviation of the applied downstream hydraulic brake pressure from the calculated theoretical brake pressure from 6.7 according to the obtained effective braking friction within the allowed operational window by the determined t tolerance. A sharp deviation of the achieved and the calculated hydraulic braking pressure is the indication of friction limited braking. When sharply increased hydraulic pressure is applied by the braking system, while no significant friction increase is generated, the potential of true friction limited braking occurs.

Figure 7:
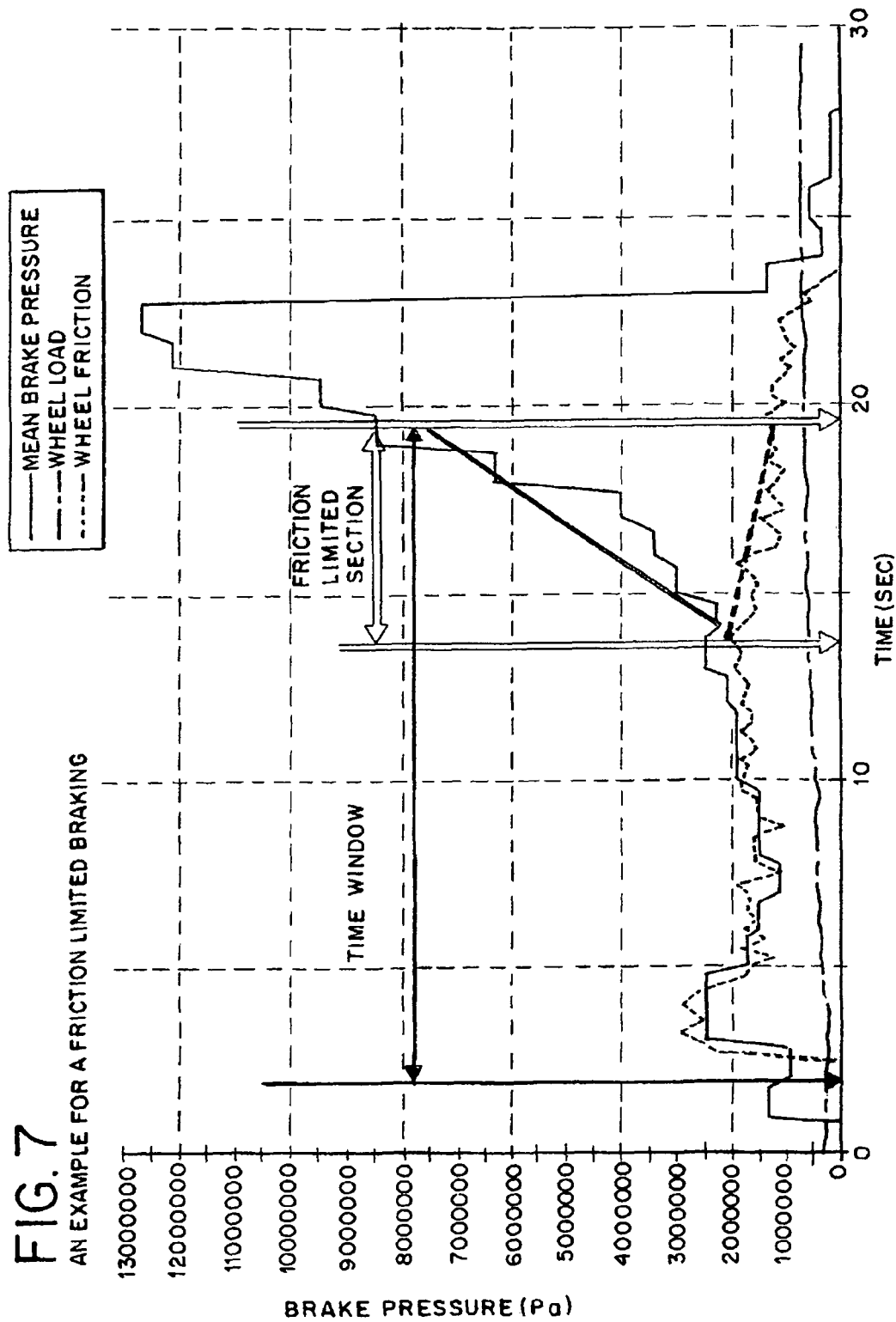
FIG. 7 An example for a friction limited braking: A graphical presentation of an example for a friction limited braking.

FIG. 7—A graphical presentation for an example for the friction limited braking, where it can be seen that that a sharply increasing hydraulic pressure is applied by the braking system, while the friction is decreasing. This is a very good example for a true friction limited braking.

The Different Applications of this Method

Figure 8:
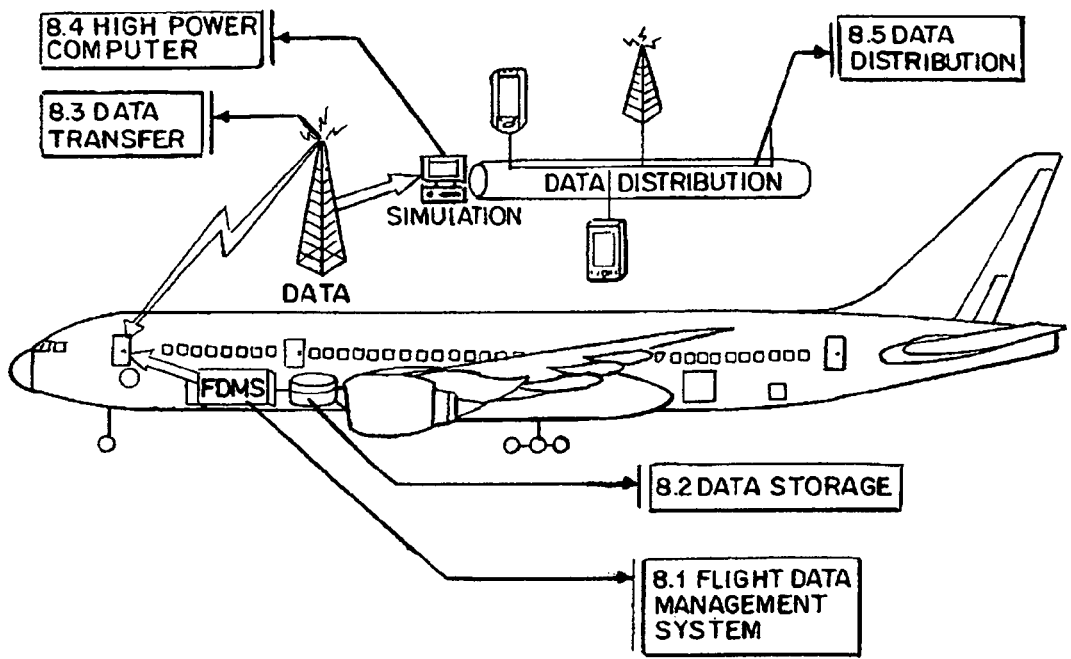
FIG. 8 Post processing and distribution: It is an illustration of the schematic of the post processing and distribution.

The Post-Processing: FIG. 8—One possible approach in obtaining the true aircraft landing performance parameters is a method of post processing. The data from the aircraft flight data management system is retrieved not real time but only after the aircraft is finished its landing, taxiing and other ground maneuvers and arrived at its final ground position. The schematic of this approach is described in FIG. 8.

8.1—All monitored and available data is sent to the flight data management system throughout the aircraft landing and ground maneuver.

8.2—Flight Data Management system collects, processes and stores the retrieved data in a data storage. The data storage is in fact part of the Flight Data Management system where all the data is stored.

8.3 Data transfer—After the airplane stopped at the gate or other designated final position, the collected data from the aircraft can be transported by wired, wireless or other means into a central processing unit, either on-board or remotely located.

8.4 High Power computer—All recorded parameters transported from the aircraft can be fed into a computer system, either on-board or remote, which is capable of processing the data and calculating/simulating all relevant physical processes involved in the aircraft landing maneuver and the actual effective braking friction coefficient of the landing aircraft and the true aircraft landing performance parameters can be computed and made ready for distribution.

8.5 Data Distribution—The computer distributes the calculated true landing parameters to other interested parties through wired, wireless or other data transportation means.

Real-Time Data Processing

Figure 9:
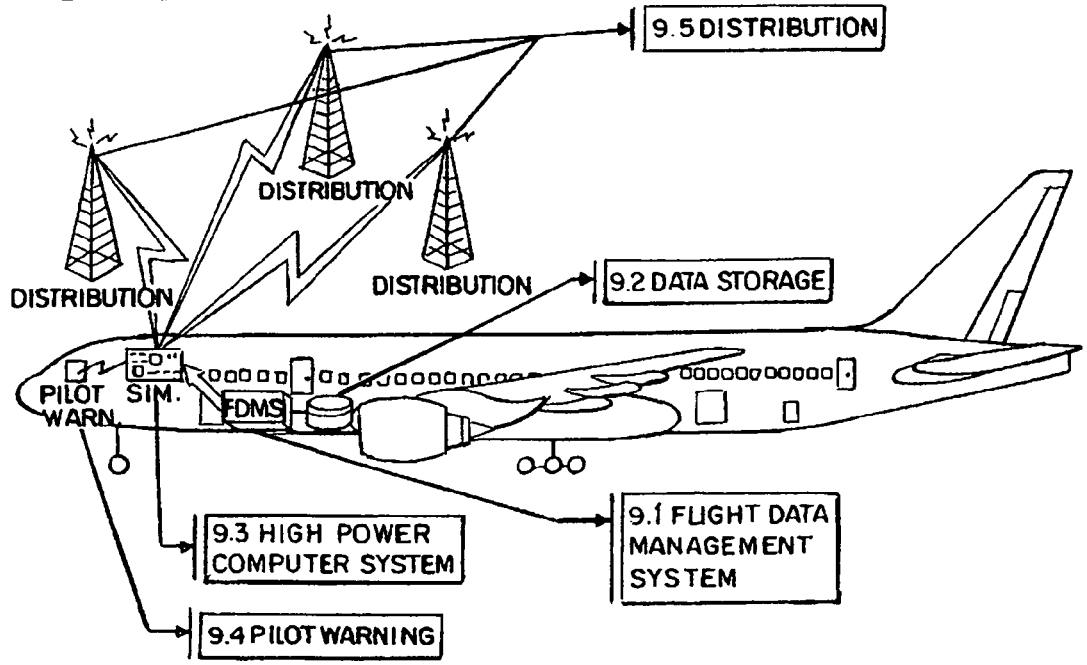
FIG. 9 Real-time processing and distribution: It is an illustration of the schematic of the real-time processing and distribution.

FIG. 9—In the case of real time data processing, all monitored parameters can be fed real time into an onboard high power computer system that is capable of processing the data and calculating all relevant physical processes involved in the aircraft landing maneuver. Based upon the calculated physical processes the actual effective braking friction coefficient of the landing aircraft can be calculated. This together with other parameters and weather data can be used to calculate the true aircraft landing performance parameters. In case the calculation finds a true friction limited section, a warning can be sent to the pilot to prevent any accident, such as over run or slide off the runway.

9.1—All monitored and available data is sent to the flight data management system throughout the aircraft landing and ground maneuver.

9.2—Flight Data Management system collects, processes and stores the retrieved data in a data storage. The data storage is in fact part of the Flight Data Management system where all the data is stored.

9.3—High power computer system: All monitored parameters fed real time into a computer system, either on-board or remote, which is capable of processing the data and calculating/simulating all relevant physical processes involved in the aircraft landing maneuver and the actual effective braking friction coefficient of the landing aircraft and the true aircraft landing performance parameters.

9.4—Pilot warning: Based on the calculated aircraft braking coefficient and the method to search for friction limited braking it gives a warning in case the friction is too low or continuously informs the driver of the generated and available braking and cornering coefficient of friction.

9.5—Distribution: The computer distributes the calculated true landing parameters to other interested parties.

Significance of the Invention:

Utilizing the novel method in this invention for the first time all personnel involved in the ground operations of an airport as well as airline personnel involved in operations including but not limited to aircraft pilots, airline operation officers and airline managers as well as airport operators, managers and maintenance crews, will have the most accurate and most recent information on runway surface friction and aircraft braking action.

Utilizing this method the aviation industry no longer has to rely on different friction readings from different instrumentations and from different procedures or assumed friction levels based on visual observation and weather data.

Therefore, this method represents a direct and substantial safety and economic benefits for the aviation industry.

Economic Benefits:

The significance of this invention involves knowing the true aircraft landing performance parameters for landing which yields substantial financial savings for the airline industry. While increasing the safety level of the takeoffs, it could also generate substantial revenue for airlines.

Therefore a system directly capable of determining the true aircraft landing performance parameters would represent direct and substantial economic benefit for the aviation industry including but not limited to:

1. Preventing over usage of critical parts, components of the aircraft including but not limited to brakes, hydraulics, and engines.

2. The distribution of the calculated parameters for the airport management helps making more accurate, timely and economic decisions including but not limited to decision on closing the airport or decision on the necessary maintenance.

3. The calculated parameters reported to the airline management yields more accurate and economic decision making including but not limited to permitting the calculation of allowable take off weights much more precisely thus increasing the permissible cargo limits.

Safety Benefits:

The significance of this invention involves the precise assessment of the true runway surface characteristics and aircraft braking and landing performance by providing the true aircraft landing performance parameters. This is fundamental to airport aviation safety, and economical operations especially under winter conditions and slippery runways. Thus, a system directly capable of determining the true aircraft landing performance parameters real-time and under any conditions without restricting ground operations of an airport would represent direct and substantial safety benefit for the aviation industry including but not limited to:

1. Providing real-time low friction warning to help pilots to make critical decisions during landing or take-off operations to prevent accidents, costly damages or loss of human lives.

2. Eliminating the confusion in the interpretation of the different Ground Friction Measuring Device readings and therefore giving precise data to airport personnel for critical and economical decision making in airport operations and maintenance.

3. Giving an accurate assessment of the actual surface conditions of the runway, that could be used in the aircraft cargo's loading decision making for safer landing or take-offs.

4. Providing accurate data for distribution to airport management personnel assisting them in more accurate, timely and safe decision making.

5. Providing data to be reported to pilots about to land for safer and more accurate landing preparation.

6. Providing data to be reported to pilots about to take off for safer and more accurate takeoff preparation 7. It could be reported to the airline management to for more accurate safety decision making.

Figure 10:
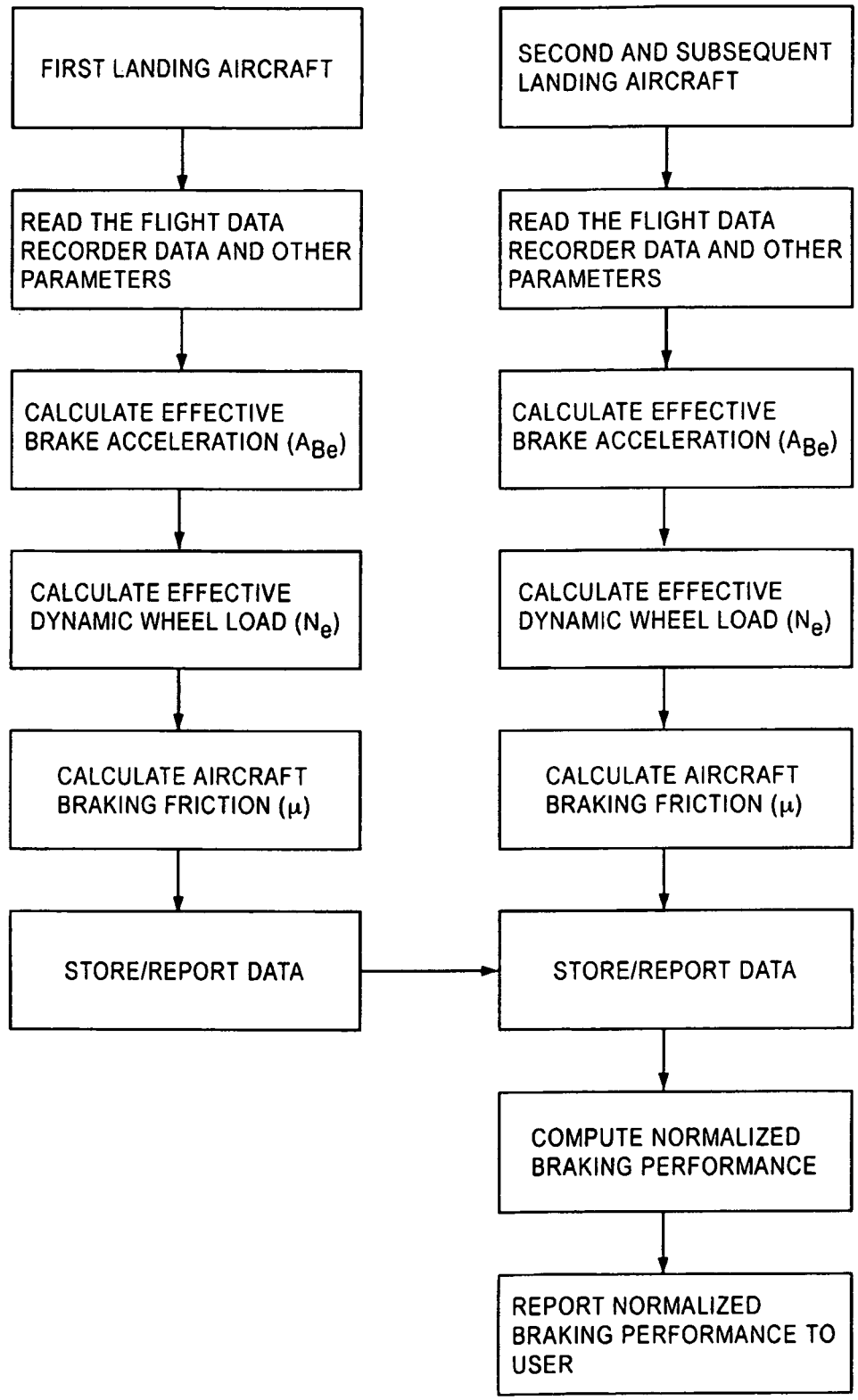
FIG. 10 A schematic flow chart illustrating a further embodiment of the invention in which a summary or normalized value of runway braking performance is created from the true aircraft landing parameters determined using the method of FIG. 6 based on a sequence of two or more landing aircraft.

Normalized Summary Braking Values. According to another aspect of the invention, best understood by reference to the flow diagram of FIG. 10, true aircraft runway coefficients of friction parameters calculated from two or more sequential landings are used to create and report a single overall "standardized" or "normalized" summary value, similar to a weighted average, thus adding redundancy and reliability to the resulting information.

Normalization is a well-known a mathematical operation in which diverse data are transformed into a common scale to permit meaningful comparison and analysis. To standardize a data set, individual values are converted to z-scores by using the mean and standard deviation of the data set. To normalize a data set, the individual values are put in order, and then transformed into a normal curve, from which a normal order statistic median is calculated.

The underlying data remain available for detailed analysis in order to review the specific conditions reported for an individual runway during a specific interval of time. However, to preserve anonymity of individual pilots and air carriers, the recorded braking action values are intentionally disassociated from any individual aircraft, pilot and landing.

The information used in the foregoing calculations is of three types: aircraft-specific (aircraft equipment and specifications), runway-specific (altitude and slope), and environment-specific (temperature, pressure and dew point). According to the computational method disclosed above, standardized or normalized braking friction coefficients are calculated and reported independent of individual aircraft, tire and other aircraft-specific parameters.

The computational method of the present invention, in contrast to prior art methods, takes into account relevant tire parameters and computes several significant aircraft-dependent dynamic forces, and is therefore able to account for variations among aircraft and equipment. In this way the present invention is able to produce and deliver a normalized and therefore more meaningful braking friction and runway condition report regardless of individual aircraft type, tire variations and runway surface types.

This method of measurement, calculation and reporting of standardized or normalized braking action coefficients beneficially incorporates redundancy at many levels. By incorporating data from two or more successive landing aircraft, multiple measurements are used to redundantly calculate and report actual runway surface conditions in real-time. As successive landings proceed on a given runway, all landings within a specific selected time interval may be used to calculate a weighted average, which is then reported to downstream users as being the actual braking conditions on that runway during that interval of time.

As a further advantage of the invention, redundancy is also incorporated into the computations of the runway conditions for any single given landing. As the aircraft decelerates through its landing roll, data is calculated along the entire path of the roll, and not just at certain selected points such as at touchdown and turnoff. These data points are averaged, creating a summary report of useful coefficient of friction values all along the aircraft's path along the runway, including touchdown, midpoint, and rollout segments. The resulting values are then used to compute a single overall summary value for the runway as a whole.

Finally, the summary coefficient of friction values for each of a subject airport's active runways are used to compute a single weighted summary value that accurately represents the overall condition of the airport as a whole, and is therefore of significant use to subsequent landing aircraft and airport operations personnel as well as air traffic control (ATC).

Among the advantages of continuously generating and reporting multiple summary values is that they afford a quick and easily understood representation of the airport runway conditions at any given time. Such a report can be read at a glance to indicate the state of each subject airport and runway of interest. As an added benefit, the availability of the underlying data allows airport and air carrier managers to at a later time look deeper into the data to obtain very specific localized runway condition information to for optimizing runway maintenance.

Additionally, air carriers can benefit from the use of the invention by having detailed real-time information as to not just current landing conditions, but more importantly, developing trends at each individual airport. The resulting benefits will include improved safety from better flight operations decisions, better pilot and crew sequencing decisions, better fuel and cargo weight management, and cost savings from reduced in-air holding patterns and optimized landing and taxiing sequences. Improvements in schedule reliability, baggage transfer and customer service are additional benefits which can be expected.

It is additionally expected that airports employing the invention will benefit from having a periodic, standardized and empirical measure of both real-time braking action conditions, and developing trends in braking action. Particularly when operating in inclement weather, with snow, ice, and hydroplaning conditions caused by winds and rain, airport operators can by use of the invention optimize runway closure and maintenance decisions.

Because of the invention's ability to record and report real-time data, at the most active commercial airports it can be expected that braking action reports will be generated within minutes of each other. This data pattern will thereby enable the airport managers to continuously monitor runway conditions during periods of high activity and thus limit the need to shut a runway down for ground-based measurement tests. Presently, without the benefits of the present invention, such ground tests can take as much as 15 to 25 minutes each, requiring ATC to place many arriving aircraft in time-wasting and fuel-wasting holding patterns. At some large airports it can take 30 minutes or more to move maintenance equipment into place and to clean a runway of snow and ice.

By employing the present invention, airport management and ATC will also be able to follow developing trends in the braking action on individual runways, which will necessarily improve airport operations and flow control decisions, and most of all, aviation safety in general. Airport operations will realize cost savings, operational efficiencies and improved customer service benefits. Air carriers will likewise realize substantial cost savings.

Off-Board Real-Time Processing. According to another embodiment of the invention, the actual aircraft runway braking performance is determined by calculating in real-time by means of off-board data processing (FIGS. 8, 9, 11). In this embodiment, all monitored parameters are fed real-time into a wired or wireless system, such as ACARS, Wireless Ground Link or similar digital wireless communication system which is capable of transmitting, with sufficient speed and bandwidth, data from the aircraft to a remote ground location, with time delays sufficiently small to be considered real-time or near real-time.

With reference to FIG. 11, the remote location receiving the data stream real-time from the aircraft is equipped with a communication system capable of accepting the real-time data stream from the aircraft's FDMS 11.1 and transmitting the data 11.3 real-time to an an off-aircraft high powered computer system 11.4, while also storing the data in an on-board date storage means 11.2. The off-aircraft high power computer system is capable of processing the data and calculating all relevant physical processes involved in the aircraft landing maneuver.

Based upon the real-time calculated physical information, the actual effective braking friction coefficient of the landing aircraft is calculated in the manner previously described. This information, together with other parameters and weather data, is then used to calculate the true aircraft landing performance parameters, including normalized true braking coefficient of friction. The calculated true aircraft landing performance parameters thus constitute the true effective braking friction coefficient, the true effective cornering friction coefficient, and the estimated true runway conditions. From this information other performance parameters can also be calculated and distributed.

The following steps are utilized in practicing this aspect of the invention, as best illustrated in FIG. 11:

11.1—Acquisition. All monitored and available data from the aircraft's on-board transducers and instrumentation is sent to the aircraft's flight data management system throughout the aircraft landing and ground maneuver.

11.2—Collection, processing and storage. The FDMS collects, processes and stores the retrieved data in a raw data storage means. The data storage means can be, and in most modern aircraft avionics system is, part of the FDMS in which all the acquired data is stored.

11.3—Data Transfer. The stored data is taken from the data storage means, conditioned and sent through communication channels, for example, through satellite communication ACARS or similar system or wireless ground link system such as WGL system, to a remote ground location real-time or near real-time.

11.4—High power computer system. The remote location is equipped with suitable communication equipment to receive the transmitted data in real-time. All the transmitted parameters are recorded and fed real-time into a suitable high-power computer system which is capable of processing the data and calculating and/or simulating all relevant physical processes involved in the aircraft landing maneuver, and thereby determining the actual effective braking friction coefficient of the landing aircraft, and the true aircraft landing performance parameters.

11.5—Distribution. The high-power computer system in the remote location is then utilized to distribute the calculated true aircraft runway landing parameters to other interested parties through wired, wireless, internet, mobile phone, fax, email or other communication channels.

I claim:

1. A computer network for calculating and distributing a true aircraft braking friction coefficient of an aircraft runway or aircraft taxiway, comprising:
    (A) A computer for obtaining aircraft property data directly or indirectly from an aircraft, wherein the aircraft property data comprises data pertaining to one or more of the following aircraft properties measured at various times for the aircraft: aircraft ground speed, aircraft brake pressure, aircraft longitudinal acceleration, aircraft engine thrust setting, aircraft reverse thrust setting, aircraft engine revolutions per minute, aircraft air speed, aircraft vertical acceleration, aircraft spoiler setting, aircraft airbrake setting, aircraft aileron setting, aircraft flap configuration, aircraft pitch, and aircraft autobrake setting; and
    (B) Wherein the computer calculates the true aircraft braking friction coefficient of the aircraft runway or aircraft taxiway using at least some of the aircraft property data obtained by the computer.

2. The computer network for calculating and distributing the true aircraft braking friction coefficient of the aircraft runway or aircraft taxiway of claim 1 wherein the computer is located on the aircraft.

3. The computer network for calculating and distributing the true aircraft braking friction coefficient of the aircraft runway or aircraft taxiway of claim 1:
    (A) Wherein the computer obtains environmental parameter data directly or indirectly from one or more data sources for one or more environmental parameters chosen from the following group: air temperature, air pressure, relative humidity, wind speed, wind direction, pressure altitude, and aircraft surface elevation; and
    (B) Wherein the computer calculates the true aircraft braking friction coefficient of the aircraft runway or aircraft taxiway using at least some of the environmental parameter data.

4. The computer network for calculating and distributing the true aircraft braking friction coefficient of the aircraft runway or aircraft taxiway of claim 2:
    (A) Wherein the computer obtains environmental parameter data directly or indirectly from one or more data sources for one or more environmental parameters chosen from the following group: air temperature, air pressure, relative humidity, wind speed, wind direction, pressure altitude, and aircraft surface elevation; and
    (B) Wherein the computer calculates the true aircraft braking friction coefficient of the aircraft runway or aircraft taxiway using at least some of the environmental parameter data.

5. The computer network for calculating and distributing the true aircraft braking friction coefficient of the aircraft runway or aircraft taxiway of claim 1:
    (A) Wherein the computer obtains aircraft parameter data directly or indirectly from one or more data sources for one or more aircraft parameters pertaining to the aircraft chosen from the following group: aircraft landing mass, aircraft engine type, number of aircraft engines, aircraft tire type, and aircraft type; and
    (B) Wherein the computer calculates the true aircraft braking friction coefficient of the aircraft runway or taxiway using at least some of the aircraft parameter data.

6. The computer network for calculating and distributing the true aircraft braking friction coefficient of the aircraft runway or aircraft taxiway of claim 2:
    (A) Wherein the computer obtains at least some of the aircraft parameter data directly or indirectly from one or more data sources for one or more aircraft parameters pertaining to the aircraft chosen from the following group: aircraft landing mass, aircraft engine type, number of aircraft engines, aircraft tire type, and aircraft type; and
    (B) Wherein the computer calculates the true aircraft braking friction coefficient of the aircraft runway or taxiway using at least some of the aircraft parameter data.

7. The computer network for calculating and distributing the true aircraft braking friction coefficient of the aircraft runway or aircraft taxiway of claim 3:
    (A) Wherein the computer obtains aircraft parameter data directly or indirectly from one or more data sources for one or more aircraft parameters pertaining to the aircraft chosen from the following group: aircraft landing mass, aircraft engine type, number of aircraft engines, aircraft tire type, and aircraft type; and
    (B) Wherein the computer calculates the true aircraft braking friction coefficient of the aircraft runway or taxiway using at least some of the aircraft parameter data.

8. The computer network for calculating and distributing the true aircraft braking friction coefficient of the aircraft runway or aircraft taxiway of claim 4:
- (A) Wherein the computer obtains aircraft parameter data directly or indirectly from one or more data sources for one or more aircraft parameters pertaining to the aircraft chosen from the following group: aircraft landing mass, aircraft engine type, number of aircraft engines, aircraft tire type, and aircraft type; and
- (B) Wherein the computer calculates the true aircraft braking friction coefficient of the aircraft runway or taxiway using at least some of the aircraft parameter data.

9. The computer network for calculating and distributing the true aircraft braking friction coefficient of the aircraft runway or taxiway of claim 1, wherein the true aircraft braking friction coefficient calculated by the computer may be accessed by or provided to one or more of the following individuals or entities via the computer network: airline operation personnel, pilots, airport personnel, airline managers, airport managers, airport maintenance crews, pilots of aircraft scheduled to take off, land, or taxi on the aircraft runway or taxiway, personnel involved in ground operations where the aircraft runway or taxiway is located, aircraft scheduling and dispatch personnel, flight service center personnel, government aviation authority personnel, air traffic controllers, airline employees, and aircraft manufacturers.

10. The computer network for calculating and distributing the true aircraft braking friction coefficient of the aircraft runway or taxiway of claim 2, wherein the true aircraft braking friction coefficient calculated by the computer may be accessed by or provided to one or more of the following individuals or entities via the computer network: airline operation personnel, pilots, airport personnel, airline managers, airport managers, airport maintenance crews, pilots of aircraft scheduled to take off, land, or taxi on the aircraft runway or taxiway, personnel involved in ground operations where the aircraft runway or taxiway is located, aircraft scheduling and dispatch personnel, flight service center personnel, government aviation authority personnel, air traffic controllers, airline employees, and aircraft manufacturers.

11. The computer network for calculating and distributing the true aircraft braking friction coefficient of the aircraft runway or taxiway of claim 3, wherein the true aircraft braking friction coefficient calculated by the computer may be accessed by or provided to one or more of the following individuals or entities via the computer network: airline operation personnel, pilots, airport personnel, airline managers, airport managers, airport maintenance crews, pilots of aircraft scheduled to take off, land, or taxi on the aircraft runway or taxiway, personnel involved in ground operations where the aircraft runway or taxiway is located, aircraft scheduling and dispatch personnel, flight service center personnel, government aviation authority personnel, air traffic controllers, airline employees, and aircraft manufacturers.

12. The computer network for calculating and distributing the true aircraft braking friction coefficient of the aircraft runway or taxiway of claim 4, wherein the true aircraft braking friction coefficient calculated by the computer may be accessed by or provided to one or more of the following individuals or entities via the computer network: airline operation personnel, pilots, airport personnel, airline managers, airport managers, airport maintenance crews, pilots of aircraft scheduled to take off, land, or taxi on the aircraft runway or taxiway, personnel involved in ground operations where the aircraft runway or taxiway is located, aircraft scheduling and dispatch personnel, flight service center personnel, government aviation authority personnel, air traffic controllers, airline employees, and aircraft manufacturers.

13. The computer network for calculating and distributing the true aircraft braking friction coefficient of the aircraft runway or taxiway of claim 5, wherein the true aircraft braking friction coefficient calculated by the computer may be accessed by or provided to one or more of the following individuals or entities via the computer network: airline operation personnel, pilots, airport personnel, airline managers, airport managers, airport maintenance crews, pilots of aircraft scheduled to take off, land, or taxi on the aircraft runway or taxiway, personnel involved in ground operations where the aircraft runway or taxiway is located, aircraft scheduling and dispatch personnel, flight service center personnel, government aviation authority personnel, air traffic controllers, airline employees, and aircraft manufacturers.

14. The computer network for calculating and distributing the true aircraft braking friction coefficient of the aircraft runway or taxiway of claim 6, wherein true aircraft braking friction coefficient calculated by the computer may be accessed by or provided to one or more of the following individuals or entities via the computer network: airline operation personnel, pilots, airport personnel, airline managers, airport managers, airport maintenance crews, pilots of aircraft scheduled to take off, land, or taxi on the aircraft runway or taxiway, personnel involved in ground operations where the aircraft runway or taxiway is located, aircraft scheduling and dispatch personnel, flight service center personnel, government aviation authority personnel, air traffic controllers, airline employees, and aircraft manufacturers.

15. The computer network for calculating and distributing the true aircraft braking friction coefficient of the aircraft runway or taxiway of claim 7, wherein true aircraft braking friction coefficient calculated by the computer may be accessed by or provided to one or more of the following individuals or entities via the computer network: airline operation personnel, pilots, airport personnel, airline managers, airport managers, airport maintenance crews, pilots of aircraft scheduled to take off, land, or taxi on the aircraft runway or taxiway, personnel involved in ground operations where the aircraft runway or taxiway is located, aircraft scheduling and dispatch personnel, flight service center personnel, government aviation authority personnel, air traffic controllers, airline employees, and aircraft manufacturers.

16. The computer network for calculating and distributing the true aircraft braking friction coefficient of the aircraft runway or taxiway of claim 8, wherein the true aircraft braking friction coefficient calculated by the computer may be accessed by or provided to one or more of the following individuals or entities via the computer network: airline operation personnel, pilots, airport personnel, airline managers, airport managers, airport maintenance crews, pilots of aircraft scheduled to take off, land, or taxi on the aircraft runway or taxiway, personnel involved in ground operations where the aircraft runway or taxiway is located, aircraft scheduling and dispatch personnel, flight service center personnel, government aviation authority personnel, air traffic controllers, airline employees, and aircraft manufacturers.

17. The computer network for calculating and distributing the true aircraft braking friction coefficient of the aircraft runway or taxiway of claim 1 wherein at least some of the aircraft property data recorded on the flight data management system is measured substantially at or after the time when the aircraft touches down on the aircraft runway during landing.

18. The computer network for calculating and distributing the true aircraft braking friction coefficient of the aircraft runway or taxiway of claim 17 wherein at least some of the aircraft property data recorded on the flight data management system is measured substantially before or until the aircraft completes taxiing following landing.

19. The computer network for calculating and distributing the true aircraft braking friction coefficient of the aircraft runway or taxiway of claim 3 wherein at least some of the aircraft property data recorded on the flight data management system is measured substantially at or after the time when the aircraft touches down on the aircraft runway during landing.

20. The computer network for calculating and distributing the true aircraft braking friction coefficient of the aircraft runway or taxiway of claim 19 wherein at least some of the aircraft property data recorded on the flight data management system is measured substantially before or until the aircraft completes taxiing following landing.

* * * * *